United States Patent
Okuda et al.

(10) Patent No.: US 7,038,165 B2
(45) Date of Patent: May 2, 2006

(54) LASER MACHINING ROBOT

(75) Inventors: Mitsuhiro Okuda, Yamanashi (JP);
Yoshitake Furuya, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 36 days.

(21) Appl. No.: 10/814,275

(22) Filed: Apr. 1, 2004

(65) Prior Publication Data

US 2004/0206735 A1    Oct. 21, 2004

(30) Foreign Application Priority Data

Apr. 17, 2003    (JP)    ............................. 2003-113161

(51) Int. Cl.
*B23K 26/02*    (2006.01)

(52) U.S. Cl. ............................. 219/121.78; 219/121.8; 219/121.83

(58) Field of Classification Search ........... 219/121.78, 219/121.79, 121.81, 121.83
See application file for complete search history.

(56) References Cited

U.S. PATENT DOCUMENTS

| | | | | |
|---|---|---|---|---|
| 5,151,608 A | * | 9/1992 | Torii et al. ............. | 250/559.38 |
| 5,489,758 A | * | 2/1996 | Nihei et al. ............ | 219/121.63 |
| 5,959,864 A | | 9/1999 | Mori et al. | |
| 6,822,187 B1 | * | 11/2004 | Hermann et al. ...... | 219/121.63 |

FOREIGN PATENT DOCUMENTS

| | | |
|---|---|---|
| EP | 0 631 838 | 1/1995 |
| EP | 1 005 941 | 6/2000 |
| JP | 6-210475 | 8/1994 |
| JP | 9-101814 | 4/1997 |
| JP | 2002-351514 | 12/2002 |
| JP | 2002351514 | * 12/2002 |

* cited by examiner

*Primary Examiner*—M. Alexandra Elve
(74) *Attorney, Agent, or Firm*—Staas & Halsey LLP

(57) ABSTRACT

If a machining program is reproduced in a robot controller and a robot is moved on a machining route, then a detection signal of a distance sensor is fetched through a distance sensor amplifier, and tracer control is carried out so as to keep a distance between a laser machining head and a workpiece at a predetermined value. In an acceleration and decoration processing in a corner, a restriction means that restricts a maximum acceleration and a maximum jerk is used to control an acceleration and a jerk of the robot not to exceed respective predetermined values, and prevents generation of a vibration when the laser machining head passes through the corner.

3 Claims, 4 Drawing Sheets

LASER MACHINING ROBOT

BACKGROUND OF THE INVENTION

1. Field of the Invention

The present invention relates to a laser machining robot having a laser machining head, mounted on a tip end of a robot arm, which conducts the laser machining and carrying out the laser machining while moving a laser machining head. More specifically, the present invention relates to a technique for moving a laser machining robot while keeping a constant distance between a tip end of a laser machining head and a workpiece during laser machining.

2. Description of the Related Art

In recent years, needs of three-dimensional machining by a laser machining apparatus using a robot in fields of general industries including the automobile industry increase. Generally, it is required that a laser machining head has high positional accuracy so as to keep optimum a distance between the laser machining head and a workpiece optimum in laser machining. In addition, some workpieces have fluctuations in shape, size, and position. In order to deal with such fluctuations, a method of controlling a position of the laser machining head at real time during machining is adopted.

However, even if this method is adopted, the following disadvantages often occur. In three-dimensional machining, a vibration is generated following a rapid acceleration or deceleration of the robot and a locus of a tip end point of the laser machining head cannot be accurately controlled. To avoid the disadvantages, a method of inputting an empirically obtained velocity condition at each time is proposed (see, for example, Japanese Patent Application Laid-Open No. 6-210475).

With this method, however, it is necessary to specify a condition in which a stable machining state can be realized while preventing an increase in machining time as much as possible by repeatedly setting a robot velocity near a section at which the vibration is generated and setting a laser output corresponding to a velocity thus set through trial and error. It disadvantageously takes lots of time to perform an operation for specifying the condition.

SUMMARY OF THE INVENTION

According to one aspect of the present invention, there is provided a laser machining robot having a laser machining head for laser machining, mounted on a tip end of a robot arm, for carrying out the laser machining by moving the laser machining head while keeping a distance between a workpiece and a tip end of the laser machining head at a predetermined distance using a distance sensor, wherein the laser machining robot restricts and controls an acceleration and a jerk (the rate of change of acceleration) for moving of the laser machining robot not to exceed a preset maximum acceleration and a maximum jerk during the laser machining, respectively.

Namely, by thus controlling, when the robot passes through a part (e.g., a corner) in which the acceleration or deceleration of the laser machining robot tends to be increased, the acceleration and the jerk are automatically suppressed, whereby a probability of generating a vibration is automatically suppressed. Further, by controlling laser machining conditions such as laser output in accordance with a change (normally a decrease) in velocity of a tip endpoint of the laser head (moving velocity of the laser machining robot) following the automatic suppression, stable laser machining with little influence of the aforesaid restriction can be realized. It is noted that limits (the maximum acceleration and the maximum jerk) of the acceleration and the jerk may be set in a design phase so as to be able to suppress the vibration at a required level.

The laser machining robot according to the present invention can be moved while automatically avoiding the generation of a vibration during machining and can easily realize a stable machining state. Therefore, the present invention can improve reliability and efficiency of laser machining carried out by the laser machining robot.

BRIEF DESCRIPTION OF THE DRAWINGS

The object of the present invention stated above as well as other objects and features of the present invention will be readily apparent from the reading of the following embodiments with reference to the accompanying drawings in which.

DESCRIPTION OF THE EMBODIMENTS

Figure 1:
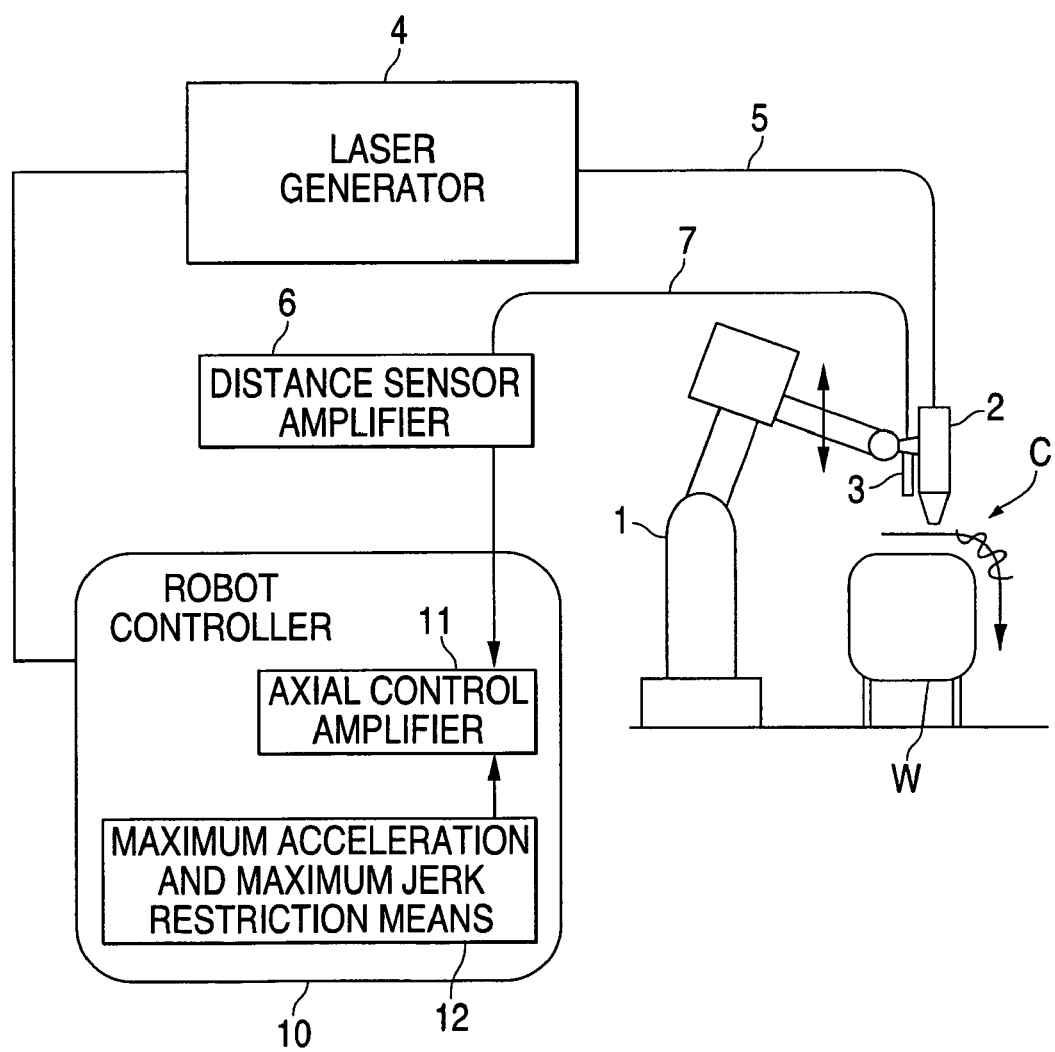
FIG. 1 is a schematic diagram of the configuration of a machining system using a laser machining robot according to a first embodiment of the present invention.

FIG. 1 shows a schematic diagram of the configuration of a machining system using a laser machining robot according to the first embodiment of the present invention. The system shown in FIG. 1 includes a robot controller 10 connected to a laser machining robot (hereinafter, "robot") 1 and controlling an operation of the robot 1, a laser machining head 2 attached to a tip end of an arm of the robot 1, and a laser generator 4 that transmits a laser beam for machining to the laser machining head 2 through an optical fiber 5. Laser output ON/OFF control and power control over the laser generator 4 are exerted by the robot controller 10 connected to the laser generator 4.

A distance sensor (or height sensor) 3 is attached to the tip end of the arm of the robot 1 in proximity to the laser machining head 2. This distance sensor 3 is connected to the robot controller 10 through a distance sensor amplifier 6 by a cable 7. The robot controller 10 controls a distance sensing operation of the distance sensor 3, and processes a detection signal of the distance sensor 3. The detection signal of the distance sensor 3 is transmitted to the robot controller 10 through the distance sensor amplifier 6.

The detection signal (which is also referred to as height sensor signal) of the distance sensor 3 represents a distance between a workpiece W and the distance sensor 3 in a direct sense. The detection signal or height sensor signal can be used as a signal that represents a distance between the workpiece W and the laser machining head 2, (or a height of a tip end of the laser machining head 2 measured from a surface of the workpiece W), in the robot controller 10.

The robot controller 10 includes a CPU, memories, an interface for input and output of an external signal, and the like as well as an axial control amplifier 11 that controls individual axes of the robot 1 in a well-known manner (the constituent elements of the robot controller 10 will not be described herein in detail) A machining program for carrying out laser machining to the workpiece W is stored in a nonvolatile memory included in the robot controller 10. By executing the machining program, the robot 1 moves on a route designated by the machining program, and the laser output ON and OFF and power of the laser generator 4 are controlled.

The machining program is a program for instructing a control for keeping "the distance between the tip end of the laser machining head 2 and the workpiece W" (hereinafter referred to as distance between the head and the workpiece") obtained based on distance information obtained from the distance sense amplifier 6, i.e., information on the distance between the workpiece W and the distance sensor 3, at a preset predetermined value using information on the distance between the head and the workpiece. The machining program includes various pieces of data for designating a moving velocity (instruction velocity) of the robot 1, time constants for acceleration and deceleration, and the like in an ordinary manner.

It is noted that the robot controller 10 further includes a restriction means (software operating in cooperation with the machining program) 12 for restricting a maximum acceleration and a maximum jerk so as not to exceed respective preset allowable values, which is a feature of the present invention. This restriction means 12 restricts the acceleration and the jerk so that they do not cause a vibration when the robot 1 passes through, for example, a corner C.

As will be described below, restriction is imposed by the restriction means 12 when it is determined that at least one of the maximum acceleration and the maximum jerk exceeds the allowable value if the movement of the head 2 is executed in accordance with the conditions (the instruction velocity and the acceleration and deceleration time constants) designated by the machining program. The restriction prevents the generation of the vibration when the robot 1 passes through the corner C. In addition, the restriction means 12 adjusts an output of the laser generator 4 so as to be tuned to the moving velocity of the laser machining head 2 in light of a velocity change following the restriction operation of the restriction means 12.

By so controlling, even if the corner C is included in the machining path, the robot 1 can carry out stable laser machining while keeping the distance between the head and the workpiece at a predetermined value designated by the machining program (or designated by a parameter separately from the designation of the machining program) during at least the execution of the machining. In other words, the robot 1 can prevent the laser machining head 2 from vibrating when the robot 1 passes through the corner C, prevent tracer control using the distance sensor 3 from being disturbed, and prevent the distance between the head and the workpiece from changing, thereby prevent adversely influencing on a machining quality.

To generate the machining program, there are known a method including indicating and generating the machining program while actually tracing a machining position, and a method including generating the machining program off line, transferring data on the program to the robot controller 10, and executing the machining program. According to the system of the present invention, a height direction of the laser machining head 2 is controlled to be a certain distance from the surface of the workpiece W based on the signal of the distance sensor 3. Therefore, in either method, it is unnecessary to accurately teach the machining position at every teaching point during the generation of a teaching program.

The signal from the distance sensor 3 is read by the robot controller 10 through the distance sensor amplifier 6, and a position of the tip end of the arm of the robot 1 is controlled so that the distance between the laser machining head 2 and the surface of the workpiece W is kept at the predetermined value. Several types are known for the distance sensor 3. According to the present invention, any of an optical detection sensor and a capacitive detection sensor can be employed.

Figure 2:
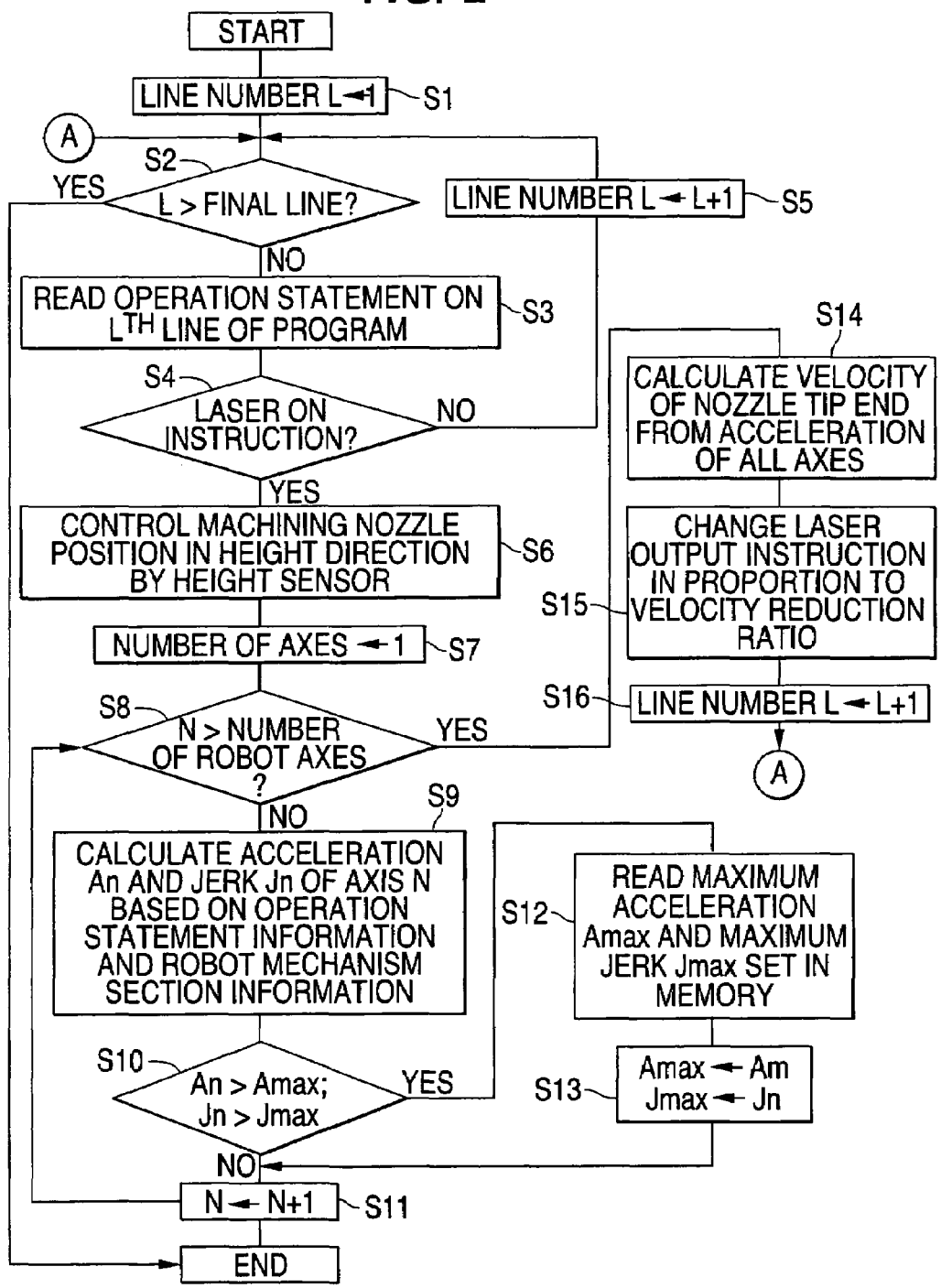
FIG. 2 is a flowchart for head height control and acceleration and deceleration control exerted by the laser machining robot shown in FIG. 1.
Figure 3:
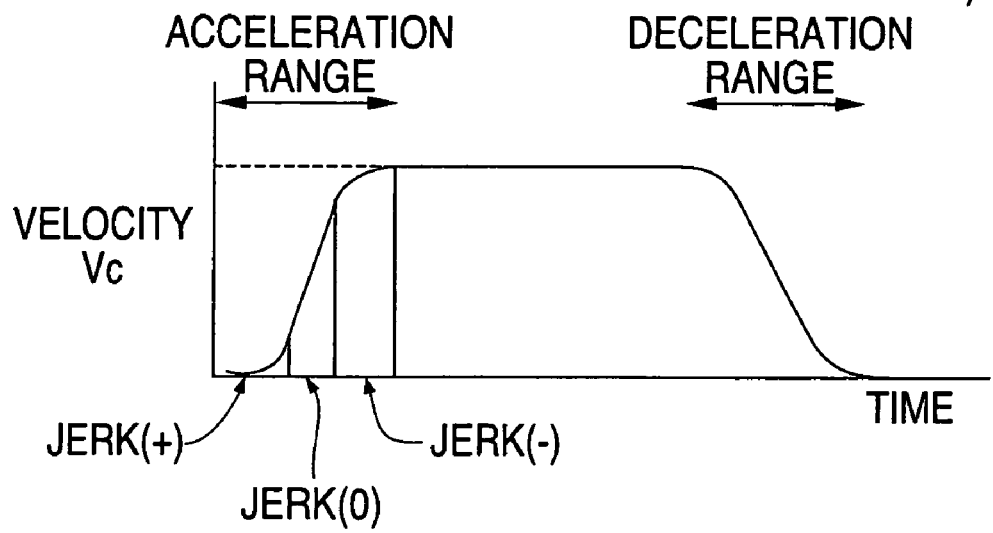
FIG. 3 is an explanatory view for a velocity instruction after an acceleration and deceleration processing shown in FIG. 2.

The height control (control of the distance between the sensor 3 and the workpiece W) and the acceleration and deceleration control of the laser machining head 2 during the execution of the machining program will next be described with reference to FIG. 2 (which is a flowchart for an outline of processing) and FIG. 3 (which is an explanatory view for a velocity instruction after the acceleration and deceleration processing). In this acceleration and deceleration processing, the acceleration and the jerk are restricted. Respective steps of the processing will be summarized as follows. A main processor in the robot controller 10 starts the processing in the following steps when the robot 1 starts operating.

Step S1: Set a line number index L (register value) for designating a line number at an initial value 1 for an instruction program to be reproduced (i.e., the machining program, hereinafter referred simply to as program).

Step S2: Finish the processing if the line designated by the line number index L is a final line. Processing proceeds to a step S3 if the designated line is not the final line.

Step S3: Read an operation statement on the line designated by the line number index L.

Step S4: Determine whether the read operation statement is a laser ON instruction or not. If the operation statement is laser ON instruction, processing proceeds to a step S6 and the laser generator 4 is turned on at an appropriate timing. If the operation statement is not laser ON instruction, processing proceeds to a step S5.

Step S5: Increment the line number index L by one. And the processing returns to the step S2.

Step S6: Start tracer control using the height sensor signal with regard to a robot position in a height direction of the machining nozzle (i.e., the laser machining head 2).

Step S7: Set a robot axis index N (register value) at an initial value 1.

Step S8: Check whether the index N exceeds the number of axes of the robot 1. If the index N does not exceed the number of axes, processing proceeds to a step S9. If the index N exceeds, the number of axes, processing proceeds to a step S14.

Step S9: Calculate an acceleration An of an axis (axis N) indicated by the index N based on the operation statement (operation instruction information) read in the step S3 and robot mechanism section information (e.g., an arm link length of the robot 1). Calculate a jerk Jn of the axis N based on a quantity of a change in the acceleration An of the axis N.

Step S10: Determine whether or not absolute values of the acceleration An and the jerk Jn of the axis N calculated in the step S9 exceed a maximum acceleration Amax and a maximum jerk Jmax set in the memory in advance, respectively. If one of the acceleration An and the jerk Jn exceeds the set maximum acceleration Amax or maximum jerk Jmax, processing proceeds to a step S12. If neither the acceleration An nor the jerk Jn exceed the set maximum acceleration Amax and maximum jerk Jmax, respectively, processing proceeds to a step S11. The maximum acceleration Amax and the jerk Jmax set in the memory are values common to the respective axes. Alternatively, the maximum acceleration Amax and the jerk Jmax may be set for each axis.

Step S11: Increment the axial index N by one, and returns the processing to the step S8.

Step S12: Read the maximum acceleration Amax and the maximum jerk Jmax set in the memory. Read the maximum acceleration Amax and the jerk Jmax set for the axis N if the maximum acceleration Amax and the jerk Jmax are set for each axis.

Step 513: Carry out the acceleration and deceleration processing shown in FIG. 3 to the axis N with acceleration and deceleration control parameters set at Amax for the maximum acceleration and Jmax for the maximum jerk, respectively. Output a velocity instruction (a moving instruction in every predetermined cycle) obtained as a result of the acceleration and deceleration processing.

That is, in an acceleration range (time range) of the robot 1, the acceleration is increased by the set jerk Jmax in every predetermined cycle, and set at zero when the acceleration reaches the maximum acceleration Amax. Next, when the velocity nears a target velocity or instruction velocity Vc, the acceleration is decreased by the set jerk Jmax in every predetermined cycle, and the acceleration and the jerk are both set at zero when the velocity reaches the instruction velocity Vc. In a deceleration range, the velocity is decreased in procedures opposite to those for the acceleration based on the set acceleration and the set jerk. The processing returns to the step S11 after the processing in the step S13 is finished.

Step S14: Calculate a moving velocity (nozzle tip end velocity) of the tip end of the laser machining head 2 from accelerations of all axes.

Step S15: Change the output of the laser generator 4 downward in accordance with a reduction ratio of the nozzle tip end velocity calculated in the step S14 (a ratio of the moving velocity to the instruction velocity Vc originally designated by the program). Namely, change a laser output instruction value according to a velocity V(t) in the acceleration range and the deceleration range. In the acceleration and deceleration ranges, control is carried out with the laser output instruction value Pc' as represented by the following equation.

$$Pc' = Pc \cdot V(t)/Vc$$

where Pc is a laser output at the instruction velocity Vc. This processing is executed whenever the moving instruction in association the acceleration and deceleration processing is output. Out of the acceleration and deceleration ranges (or if the output of the moving instruction in association with the acceleration and deceleration processing is over), the laser output value is returned to an original laser output.

Step S16: Increment the line number index L by one, and return the processing to the step S2.

By executing this processing cycle, the laser output instruction is turned on and the laser machining is executed under the tracer control based on the read height sensor signal whenever the laser machining head 2 arrives at a start position of each laser machining interval. Further, the acceleration and deceleration are checked with regard to the acceleration and deceleration control at the time of the execution of the laser machining. A content of the acceleration and deceleration control is forcedly changed during vibration prevention and prediction. In the acceleration and deceleration ranges, the laser output instruction value is also changed according to the velocity V(t) in the acceleration and deceleration ranges.

Whenever the laser machining head 2 reaches an end position of each laser machining interval, a laser output OFF instruction is read and the laser output is turned off. At the same time, reading of the height sensor signal is finished. If the program reaches the final line, the processing is finished in accordance with a processing end instruction statement.

In this embodiment, the distance sensor (or height sensor) 3 that monitors the distance between the head and the workpiece (i.e., nozzle height) is attached to the tip end of the arm of the robot 1 separately from the laser machining head 2. Needless to say, even if the distance sensor (or height sensor) 3 is attached to the laser machining head 2 itself, the distance sensor 3 can similarly monitor the distance between the head and the workpiece. Alternatively, an additional axis may be provided at the robot 1 and this additional axis may be controlled in response to the height sensor signal so as to carry out the tracer control for keeping the distance between the head and the workpiece (or nozzle height) at the predetermined value.

Figure 4A:
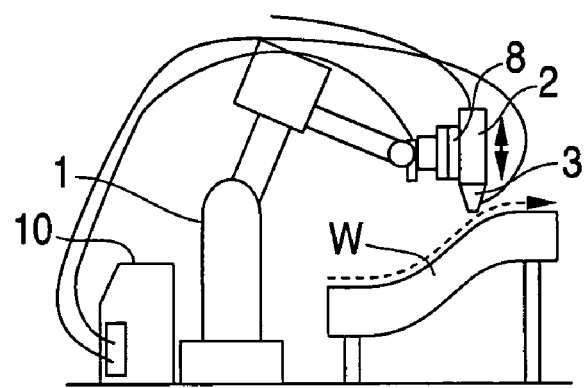
FIG. 4A is a schematic diagram of the configuration of a machining system using a laser machining robot according to a second embodiment of the present invention.

FIG. 4A is a schematic diagram of the configuration of a machining system using a laser machining robot according to the second embodiment of the present invention. In this system, an additional axis 8 is provided at the robot 1, and the distance sensor (or height sensor) 3 is attached to the laser machining head 2 itself. This additional axis is controlled in response to the height sensor signal from the distance sensor 3.

Figure 4B:
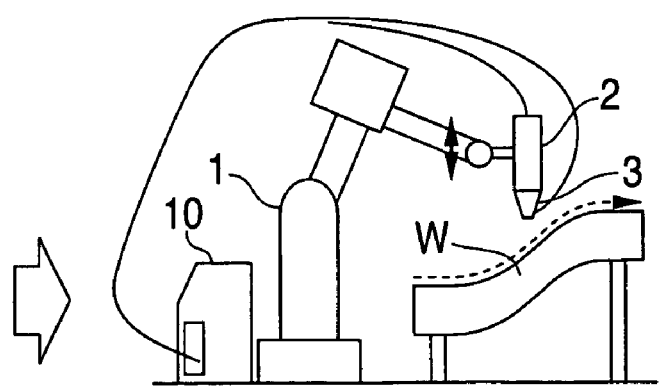
FIG. 4B is a schematic diagram of the configuration of a machining system using a laser machining robot according to a third embodiment of the present invention.

FIG. 4B is a schematic diagram of the configuration of a machining system using a laser machining robot according to the third embodiment of the present invention. In this system, the distance sensor (or height sensor) 3 is attached to the laser machining head 2 itself, and the tracer control is carried out by controlling six axes of the robot 1.

Each of the system shown in FIG. 4A and the system shown in FIG. 4B executes the restriction on the acceleration and the jerk of the robot 1 as described in the first embodiment.

According to the present invention, the disruption of the locus caused by the vibration generated when the robot is quickly accelerated can be prevented. Accordingly, stable laser machining can be executed even in instances in which the corner is included in the machining route, e.g., for a complicated three-dimensional workpiece.

The invention claimed is:

1. A laser machining robot, in which both a laser machining head for laser machining and a distance sensor are mounted on a robot arm tip end, a distance between the distance sensor and a workpiece is detected by the distance sensor, and the laser machining is carried out by moving said laser machining head while keeping a distance between the workpiece and a tip end of said laser machining head at a predetermined distance, the laser machining robot comprising:

control means for controlling an acceleration of the laser machining robot movement not to exceed a preset maximum acceleration, and controlling a jerk not to exceed a preset maximum jerk during said laser machining; and means for changing a laser machining condition according to a change in a moving velocity of said laser machining robot if the moving velocity is changed by a moving control exerted by said control means.

2. A laser machining robot, in which a laser machining head that comprises a distance sensor and carries out laser machining is mounted on a tip end of a robot arm, a distance between the distance sensor and a workpiece is detected by the distance sensor, and the laser machining is carried out by moving said laser machining head while keeping a distance between the workpiece and a tip end of said laser machining head, the laser machining robot comprising:

control means for controlling an acceleration of the laser machining robot movement not to exceed a preset maximum acceleration, and controlling a jerk not to exceed a preset maximum jerk during said laser machining; and means for changing a laser machining condition according to a change in a moving velocity of said laser machining robot if the moving velocity of said laser machining robot is changed by a moving control exerted by said control means.

3. A method of controlling a laser machining robot, comprising:

controlling an acceleration of the laser machining robot movement not to exceed a preset maximum acceleration, and controlling a jerk not to exceed a preset maximum jerk during laser machining; and changing a laser machining condition according to a change in a moving velocity of said laser machining robot if the moving velocity is changed by a moving control.

* * * * *

UNITED STATES PATENT AND TRADEMARK OFFICE
CERTIFICATE OF CORRECTION

PATENT NO.       : 7,038,165 B2
APPLICATION NO.  : 10/814275
DATED            : May 2, 2006
INVENTOR(S)      : Mitsuhiro Okuda et al.

It is certified that error appears in the above-identified patent and that said Letters Patent is hereby corrected as shown below:

Column 1, Line 66, change "endpoint" to --end point--.

Column 3, Line 6, after "detail)" insert --.--.

Column 4, Line 52, after "exceeds" delete ",".

Column 5, Line 14, change "513" to --S13--.

Signed and Sealed this

Twenty-eighth Day of November, 2006

JON W. DUDAS
*Director of the United States Patent and Trademark Office*